United States Patent
Griffin et al.

(10) Patent No.: US 10,419,209 B1
(45) Date of Patent: Sep. 17, 2019

(54) PARALLEL ASSURANCE OF BLOCKCHAIN SIGNATURES

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 198 days.

(21) Appl. No.: 15/498,374

(22) Filed: Apr. 26, 2017

(51) Int. Cl.
| | |
|---|---|
| *H04L 9/06* | (2006.01) |
| *H04L 9/32* | (2006.01) |
| *H04L 9/00* | (2006.01) |
| *H04L 9/30* | (2006.01) |
| *H04L 9/14* | (2006.01) |

(52) U.S. Cl.
CPC ............ *H04L 9/0637* (2013.01); *H04L 9/006* (2013.01); *H04L 9/0643* (2013.01); *H04L 9/14* (2013.01); *H04L 9/30* (2013.01); *H04L 9/3247* (2013.01); *H04L 9/3263* (2013.01); *H04L 2209/12* (2013.01)

(58) Field of Classification Search
CPC .................................................... H04L 9/0637
See application file for complete search history.

(56) References Cited

U.S. PATENT DOCUMENTS

| | | |
|---|---|---|
| 2016/0203496 A1 | 7/2016 | Guerrero et al. |
| 2016/0330027 A1 | 11/2016 | Ebrahimi |
| 2017/0046651 A1* | 2/2017 | Lin ..................... G06Q 20/0655 |
| 2017/0075941 A1* | 3/2017 | Finlow-Bates ....... H04L 67/104 |
| 2018/0331832 A1* | 11/2018 | Pulsifer .................. G06Q 20/38 |

OTHER PUBLICATIONS

American National Standard for Financial Services, "Cryptographic Message Syntax ASN.1 and XML", ANSI X9.73/2010, Apr. 15, 2010. 89 pages.
American National Standard for Financial Services, Retail Financial Services-Requirements for Protection of Sensitive Payment Card Data—Part 2: Implementing Post-Authorization Tokenization Systems, ANSI x9.119-2016. 67 pages.

(Continued)

*Primary Examiner* — Simon P Kanaan
(74) *Attorney, Agent, or Firm* — Foley & Lardner LLP

(57) ABSTRACT

In a system and methods to verify data integrity and origin authenticity of signed elements in an arbitrary blockchain, a block is signed using a first digital signature algorithm. A hash on the signed first block value is computed. A parallel assurance of blockchain signatures ("PABS") record includes a cryptographic message, comprising the block identifier and the hash, and is signed using a second digital signature algorithm, which, in some embodiments, is different from the first digital signature algorithm. Integrity and origin authenticity of the signed block value are verified by verifying the digital signature of the first cryptographic message. Additionally, to verify the block value, a verification hash is computed on the signed block value of the block of the blockchain, and the verification circuit verifies that the hash from the cryptographic message matches the verification hash.

21 Claims, 13 Drawing Sheets

(56) References Cited

OTHER PUBLICATIONS

American National Standard for Financial Services, Biometric Information Management and Security for the Financial Services Industry, ANSI X9.84-2010. 172 pages.

American National Standard for Financial Services, Trusted Time Stamp Management and Security, ANSI X9.95-2011. 150 pages.

Chirgwin, R., Crypto boffins propose replacing certification authorities with . . . Bitcoin?, The Register, Nov. 3, 2013, retrieved from the Internet at http://www.theregister.co.uk/2013/11/03/crypto_boffins_propose_getting_rid_of_cas/ on Apr. 25, 2016, 3 pages as printed.

Fromknecht, et al, A Decentralized Public Key Infrastructure with Identity Retention, IACR Cryptology ePrint Archive: Report 2014/803, Nov. 11, 2014, 16 pages.

Garman, et al., Decentralized Anonymous Credentials, IACR Cryptology ePrint Archive: Report 2013/622, Oct. 15, 2013, retrieved from the Internet at https://eprint.iacr.org/2013/622.pdf on Apr. 25, 2016, 21 pages.

ITU-T, X.1035, Series X: Data Networks, Open System Communication and Security Telecommunication security, Password-authenticated key exchange (PAK) protocol, Feb. 2007. 12 pages.

ITU-T, X.660, Information Technology—Procedures for the operation of object identifier registration authorities: General procedures and top arcs of the international object identifier tree, Jul. 2011. 32 pages.

ITU-T, X509, Information technology—Open Systems Interconnection—The Directory: Public-key and attribute certificate frameworks, Oct. 2012. 208 pages.

Robles, P., Can the blockchain replace SSL?, ProgrammableWeb, Mar. 17, 2015, retrieved from the Internet at http://www.programmableweb.com/news/can-blockchain-replace-ssl/analysis/2015/03/17 on Apr. 25, 2016, 4 pages as printed.

\* cited by examiner

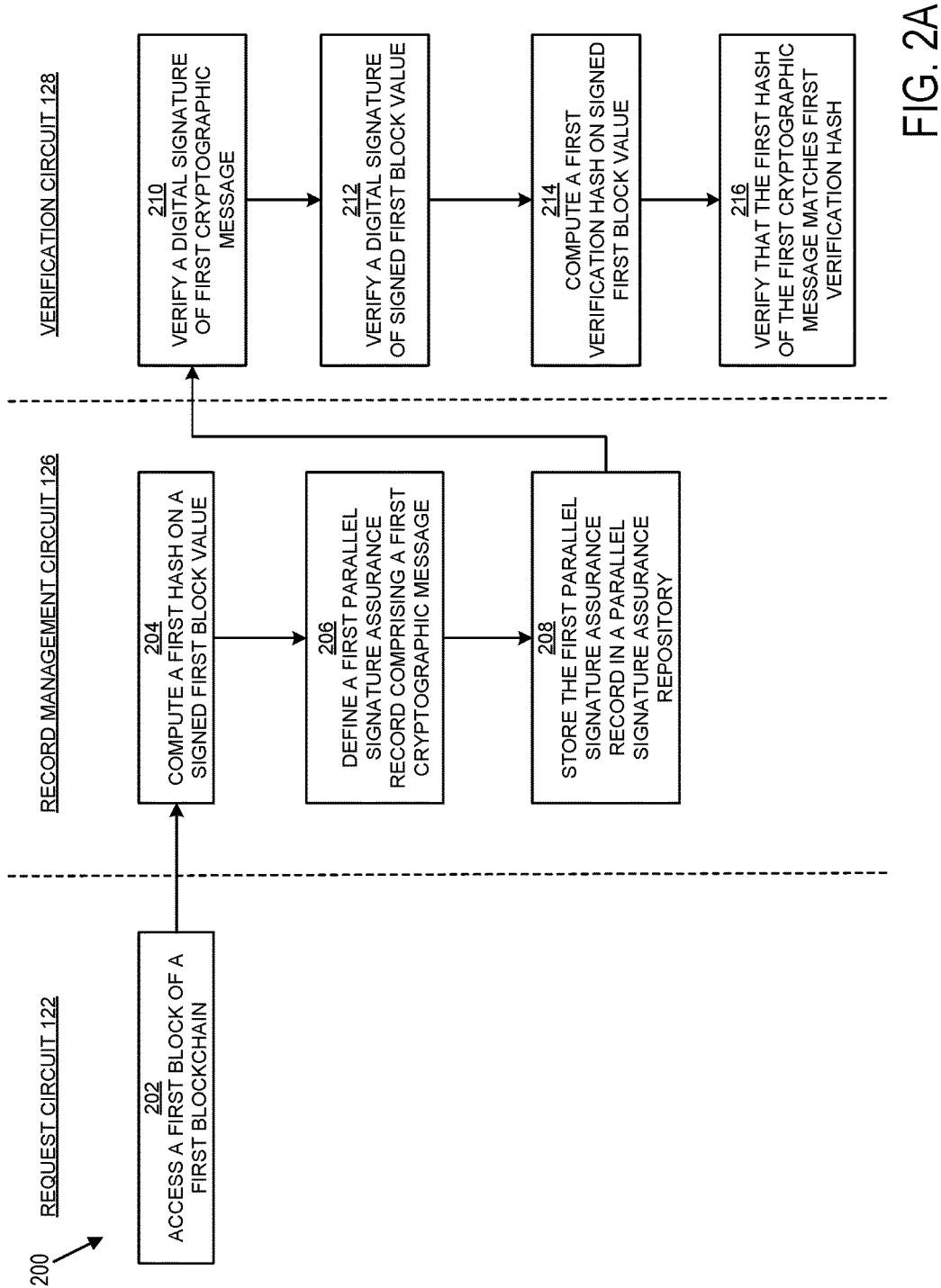

US 10,419,209 B1

PARALLEL ASSURANCE OF BLOCKCHAIN SIGNATURES

TECHNICAL FIELD

The present application relates generally to systems and methods for parallel assurance of digital signatures, particularly on blocks of a blockchain.

BACKGROUND

As computer-based technologies have evolved, conventional in-person and paper-based transactions, communications, and record-management functions are increasingly performed electronically over networks (e.g., the internet). Increasingly, digital signatures are used in e-commerce and in regulatory filings to implement electronic transactions in a cryptographically protected way. A blockchain is a distributed database or a distributed ledger whose beneficial attributes include permanency and security. These attributes, however, depend on information security techniques implemented using cryptography. Conventionally, to ensure data integrity, the content (such as transactions) of blocks is digitally signed by the content providers, and blocks on a blockchain are hashed by the block publishers. Consumers of information that resides on the blockchain rely on the blockchain hashes and on the digital signatures to verify data authenticity.

Digital signatures are mathematical schemes for demonstrating the authenticity of digital messages or electronic documents. A variety of cryptographic techniques, including symmetric and asymmetric key cryptographic systems, are used to protect data and to create digital signatures. With symmetric key cryptographic systems, a pair of users who desire to exchange data securely use a shared "symmetric" key. With this approach, a sender of a message uses the same key to encrypt the message or create a message authentication code (MAC) that a recipient of the message uses to decrypt the message or verify the MAC. Symmetric key systems require that each of the sender and the recipient establish the shared key in a secure manner. Asymmetric (e.g., public key) cryptographic systems may also be used to exchange messages securely. In public key cryptographic systems, key pairs are conventionally used—public keys and private keys. A sender of a message may encrypt the message using the public key of a recipient. The recipient may use the corresponding private key to decrypt the message.

Additionally, public key cryptographic systems (e.g., asymmetric key cryptographic systems) may be used to produce digital signatures. A sender of a message may sign the message using its private key such that the recipient can knowingly use the sender's public key to verify the digital signature and thus the signed message. A recipient of a message that has been digitally signed can use the public key's owner name and digital signature to verify the identity of the message's sender and to confirm that the message has not been altered during transit. Digital signatures may contain cryptographic hash values calculated over signed content.

The cryptographic landscape is marked by the following developments: deprecation of cryptographic algorithms when they are shown to contain security flaws or weaknesses; the need to extend key lengths over time to maintain confidence in their strength; changes in organizational and/or industry security policy requirements for cryptography; and advances in the state of the art, such as the emergence of new cryptographic algorithms and security techniques offering greater protection or more efficient processing. In the face of continuing changes to the cryptographic landscape, it is desirable to ensure ongoing confidence in digitally signed content, especially if the digitally signed content must be protected over long periods of time. Examples of digitally signed content that must be protected over long periods of time and/or requires long-term storage include 30-year mortgage instruments, title transfer and recordation instruments, long-term contracts, compliance-sensitive transactions, electronic health records and related transactions, and the like.

Although electronic communications have significantly reduced costs and improved efficiencies, they pose significant risks that may impede origin authenticity and data integrity. For example, when blockchain data needs to be verified over a long period of time, such as in an electronically recorded agreement requiring long-term storage (e.g., a 30-year mortgage), encryption techniques used to verify the initial transaction at the time the contract was formed may become outdated. Further, encryption techniques may become compromised. Further still, collaboration among multiple parties that rely on a blockchain may be impeded if these parties cannot agree on a cryptographic method to use to verify content.

SUMMARY

Various embodiments relate to a method performed by a processor of a computing system for parallel assurance of blockchain signatures (PABS). An example method includes accessing a first block of a first blockchain by a request circuit of a parallel signature assurance computing system. In this example implementation, the original (first) block on the blockchain is signed using PABS and is subsequently verified using PABS. The first block includes a first block identifier and a first block value signed using a first digital signature algorithm. In some embodiments, a different (e.g., more up-to-date) signature algorithm is used later on as part of validating the original block using the PABS protocol. A first hash on the signed first block value is computed by a record management circuit of the PABS computing system. The record management circuit defines a PABS record, which includes a first cryptographic message. The first cryptographic message includes the first block identifier and the first hash and is signed using a second digital signature algorithm, which, in some embodiments, is different from the first digital signature algorithm. The record management circuit stores the first PABS record in a PABS repository.

In the example method, integrity and origin authenticity of the signed first block value are verified by a verification circuit of the PABS computing system, verifying the digital signature of the first cryptographic message. Additionally, the digital signature of the signed first block value is verified such that a first verification hash is computed on the signed first block value of the first block of the first blockchain, and the verification circuit verifies that the first hash from the first cryptographic message matches the first verification hash.

Various other embodiments relate to a PABS computing system. An example PABS computing system includes a request circuit structured to access a first block of a first blockchain. The first block includes a first block identifier and a first block value signed using a first digital signature algorithm. The PABS computing system also includes a record management circuit, which computes a first hash on the signed first block value. The record management circuit defines a first PABS record. The first PABS record includes a first cryptographic message. The first cryptographic message includes the first block identifier and the first hash and is signed using a second digital signature algorithm. The record management circuit stores the first PABS record in a PABS repository. A verification circuit verifies the integrity and origin authenticity of the signed first block value by verifying a digital signature of the first cryptographic message, verifying a digital signature of the signed first block value, computing a first verification hash on the signed first block value of the first block of the first blockchain, and verifying that the first hash from the first cryptographic message matches the first verification hash.

In certain embodiments, a non-transitory computer-readable media includes computer-executable instructions embodied therein. When executed by a processor of the PABS computing system, instructions cause the PABS computing system to perform a process including the steps described herein.

BRIEF DESCRIPTION OF THE DRAWINGS

FIG. 2A is a schematic flow diagram illustrating a method of generating a PABS record, and verifying data integrity and origin authenticity of the PABS record, according to an example embodiment.

Figure 1:
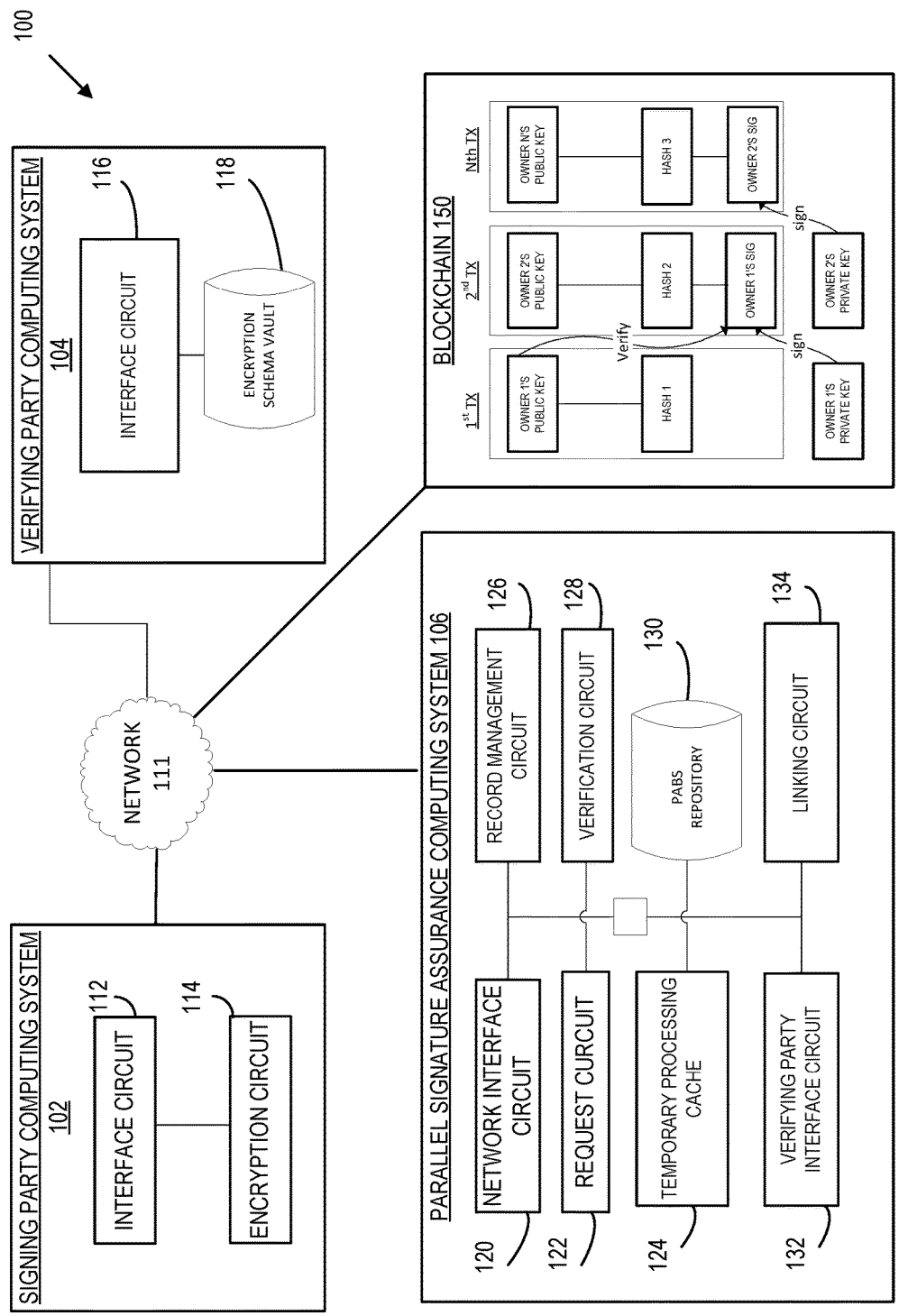
FIG. 1 is a component diagram of a system for parallel assurance of blockchain signatures (PABS), according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Referring to the figures generally, various embodiments described herein relate to systems and methods for parallel assurance of blockchain signatures (PABS). As will be appreciated, the PABS system may be used to create and verify PABS records in connection with e-commerce transactions, record management, or other types of signing events, such as those involving cloud-based, database, and blockchain-based systems, for example. The PABS protocol comprises systems and methods to allow parties that require long term permanence, and wish to mitigate the risk of loss of assurance in cryptographic techniques as these techniques evolve, to independently verify the data integrity and origin authenticity of the signed blocks, transactions, and/or transaction elements in a blockchain. This assurance is possible even when the cryptographic algorithms (e.g., digital signature and/or hash algorithms) used by the blockchain provider are no longer secure or trustworthy. As will be appreciated, the PABS systems and methods comprise systems and methods for generating and managing PABS records, cryptographic messages, hash computation components of cryptographic messages, and linkage identifiers for PABS records.

According to various example embodiments, as described in further detail below, systems and methods for PABS provide a technical solution to the challenges presented by the need to verify large blockchains and securely aggregate the information contained in certain blocks without relying on cryptographic techniques used by original signers of blocks. Over time, a blockchain may become cumbersomely large. Consequently, the proof-of-work that is required to verify the blockchain becomes an increasingly strenuous calculation and process. PABS solves this problem by providing a mechanism to aggregate (pull out and combine in a meaningful and secure fashion) the data points of value from, for example, a transaction history recorded on the blockchain. As explained in detail further herein, such data points of value may be represented by blocks, transactions, or transaction elements.

Additionally, it is desirable to decrease the size of objects sent across the network. To accomplish this, certain known digital signature implementations not designed for blockchain, such as various Cryptographic Message Syntax (CMS) implementations (e.g., SignedData), provide methods for determining the validity of signatures in the SignedData object in which the actual data (content that is signed) is detached from the signed SignedData object.

To verify the signature of the detached content, however, an application must have a copy of the original content. Thus, the recipient of the detached object must have an original copy of the signed data. To minimize the risk of data being compromised, PABS provides an intermediary system to authenticate and verify the integrity of signed data without sending the original signed content to the requestor.

Furthermore, cryptographic algorithms, processing modes, and key lengths are not permanent and are subject to change. Thus, assurance that a blockchain possesses permanency and security depends on the ability of the relying parties to trust the underlying cryptography to provide data integrity and origin authenticity services. Given the technical problem of cryptographic techniques continually coming under attack, and the fact that conventional cryptographic techniques generally have not been shown to be capable of providing reliable long-term protection, it is desirable to mitigate the risk of loss of assurance in the cryptographic techniques that protect a blockchain or its content while preserving the integrity of underlying data. Advantageously, PABS accomplishes this by, for example, allowing verifiers to use their own hashes and/or signature algorithms on shared content without compromising data integrity. This also facilitates accommodating different organizational needs, technical capabilities, and regulatory requirements, such as in cross-border transactions and/or in consortia where members have different security requirements.

According to various embodiments, systems and methods for PABS also allow multiple entities, each with different encryption requirements, to each maintain and preserve data integrity and origin authenticity of content in a shared blockchain. For example, multiple entities may be part of a consortium that conducts inter-entity transactions using a shared blockchain. The blockchain utilizes a first digital signature algorithm and a first hash algorithm. This may be sufficient for a first entity in the consortium. However, a second entity in the consortium may have different security requirements that require use of stronger or simply different digital signature and/or hash algorithms. Accordingly, the second entity may utilize PABS to create parallel PABS records from the content in the blockchain using a second digital signature algorithm and a second hash algorithm. The second entity may choose to create PABS records for all of the blocks in the blockchain, or for only those blocks for which the second entity or its clients were involved. A third entity of the consortium may similarly create its own parallel PABS repository according to its security requirements. Accordingly, systems and methods for PABS provide technical improvements over existing blockchain systems by enabling entities to each individually preserve integrity and origin authenticity of blockchain content using the respective entities' desired cryptographic algorithms and techniques.

FIG. 1 is a component diagram of a system 100 for PABS, according to an example embodiment. PABS allows its users to independently verify the data integrity and origin authenticity of the signed blocks, transactions, and/or transaction elements in a blockchain or a similar data structure without having to rely on the same encryption algorithm throughout the lifetime of a signed blockchain transaction. Here, a blockchain transaction is defined as an event that is recorded in a blockchain block. One example of a blockchain transaction is a multi-year mortgage agreement. Another example of a blockchain transaction is a recordation of a property transfer in electronic property recordkeeping systems. Yet another example is a payment/funds transfer transaction using a math-based currency protocol, such as Bitcoin.

An example of a conventional blockchain is the blockchain 150 shown in FIG. 1. The blockchain 150 comprises a first transaction, a second transaction, and an N-th transaction. Each of these transactions includes a public key, a hash, and an owner's signature. Between the first transaction and the second transaction, the first owner's public key associated with the first transaction is used to verify the first owner's signature with respect to the second transaction. The first owner's signature with respect to the second transaction is generated using the first owner's private key. Thus, each successive owner of a block that represents a transaction hands off the block to the next owner.

In some embodiments, the system 100 comprises a signing party computing system 102, a verifying party computing system 104, a PABS computing system 106, and a blockchain 150, each in operative communication with the others via a network 111. The network 111 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

The signing party computing system 102 is structured to verify and digitally sign a block representing a transaction. In some embodiments, the signing party computing system 102 comprises an interface circuit 112 and an encryption circuit 114. The interface circuit 112 is structured to facilitate operative communication between the signing party computing system 102, the verifying party computing system 104, and the PABS computing system 106 via the network 111. The encryption circuit 114 of the signing party computing system 102 is structured to allow the signing party to verify and digitally sign the initial content of a block. For example, when an initial block is recorded on the blockchain, the user of the signing party computing system 102 may provide a digital signature according to a conventional encryption algorithm to verify the integrity of the transaction. The resulting signed block is an input to the systems and methods of PABS, as described further herein.

A user of the verifying party computing system 104 may use the system 104 to direct the PABS computing system 106 to perform any of the functions of PABS, as described further herein. In some implementations, for example, the user of the signing party computing system 102 may be one of the parties in a financial transaction, and the user of the verifying party computing system 104 may be an external regulatory body confirming the accuracy of the financial transaction. The user of the verifying party computing system 104 may be, for example, an auditor who wishes to verify a digitally signed block produced by a user of the signing party computing system 102. In some implementations, the PABS computing system 106 does not contain a record for each block in the blockchain 150. Instead, the PABS computing system 106 contains a sample of records to support reasonable audits of the blockchain 150 such that an auditor may evaluate a large enough sample to gain assurance the blockchain 150 conforms to the audit criteria.

In some embodiments, the verifying party computing system 104 comprises an interface circuit 116 and an encryption schema vault 118. The interface circuit 116 is structured to allow the verifying party computing system 104 to communicate with the signing party computing system 102 and the PABS computing system 106 and to relay messages via the network 111.

Figure 5:
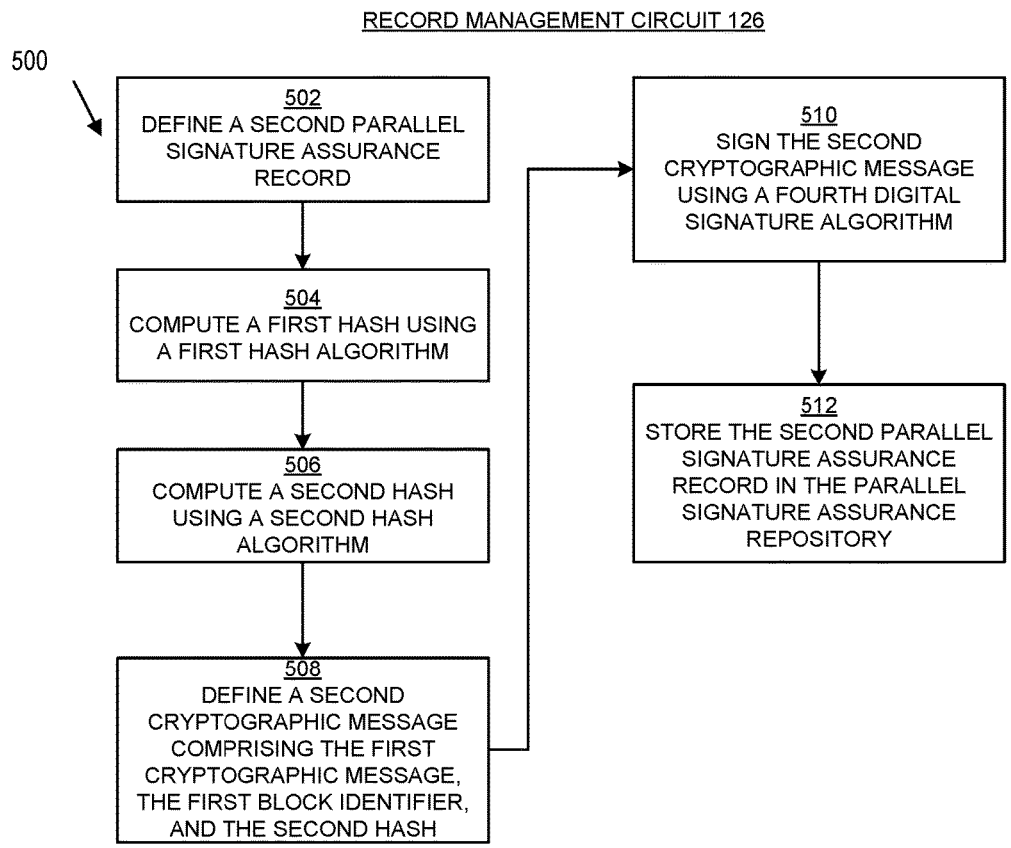
FIG. 5 is a schematic flow diagram illustrating a method of managing a hash computation component of a cryptographic message for PABS, according to an example embodiment.

The encryption schema vault 118 is structured to supply to the PABS computing system 106 an encryption algorithm and/or a hash algorithm used by the user of the verifying party computing system 104 to digitally sign verification results as described, for example, in reference to FIG. 5. In some embodiments, there are multiple verifying parties, each associated with a different verifying party computing system 104 and each using a different digital signature algorithm. For example, auditors may be from different organizations and/or countries, which may have different security and encryption requirements.

The PABS computing system 106 is structured to allow independent verification of digital ledger components, as set forth further herein. In some embodiments, the PABS computing system 106 comprises a network interface circuit 120, a request circuit 122, a temporary processing cache 124, a verifying party interface circuit 132, a record management circuit 126, a verification circuit 128, a PABS repository 130, and a linking circuit 134. The PABS computing system 106 communicates with the signing party computing system 102 and the verifying party computing system 104 via at least the network interface circuit 120, request circuit 122, and verifying party interface circuit 132.

The record management circuit 126 is structured to define, manage, and digitally sign PABS records, including managing cryptographic messages and hashes. To that end, the temporary processing cache 124 is structured to hold the intermediate computations needed to create a PABS record, and the PABS repository 130 is structured to manage and store the PABS records. The PABS repository 130 may be structured, for example, as a relational database, a blockchain, or a sequence of encapsulated CMS objects using attached signatures. Importantly, as described further herein, the record management circuit 126 and the PABS repository 130 are, in some implementations, configured to store the original signed block in a detached fashion such that a copy of original block value, verified using PABS, is linked, in the PABS repository 130, to the block's subsequent verification history, for example, via encapsulation (nesting), as described in detail in reference to FIGS. 3 and 4. The verification circuit 128 is structured to verify digital signatures of block value, including the computation and management of verification hashes on signed block value. The linking circuit 134 is structured to aggregate various points of interest in a sequence of blockchain transactions such that these points are independently verified.

In some embodiments, the PABS record includes a trusted time stamp over the first block value. In certain implementations, the PABS record includes a trusted time stamp of the first block content, or in the case of the PABS operating on not just the block content but the block content and the signature over that block, a time stamp on the first block content and its signature.

In some embodiments, the PABS record includes an identifier of the security policy associated with the creator of the PABS record so that future verifiers may use this identifier to judge compliance with the policy. Over time, security policies may change and PABS records are signed using then-current security policies, providing further assurance while ensuring the continuity of the audit trail associated with the audited block.

In certain embodiments, verifiers, as part of the verification process, check the security policy to see if the signature contained in the PABS record is compliant. In certain embodiments, the signature is determined to be compliant by determining that a valid algorithm was used. Not only may the algorithm change over time, but the keys used to sign and verify the signature may change. Thus, in some embodiments, the signature is determined to be compliant by determining, for example, that a valid key length was used. Public key infrastructure (PKI) certificates have a shelf life, as they are issued for a period of time that can expire. In some embodiments, the signature is determined to be compliant by determining that the signer (creator of PABS) was an authorized auditor at the time the signature was created.

FIG. 2A is a schematic flow diagram of a method 200 of generating a PABS record, and verifying data integrity and origin authenticity of the PABS record, according to an example embodiment. The method 200 allows one to generate a PABS record on blockchain content and to subsequently verify data integrity and origin authenticity of the blockchain content using the PABS record. The method 200 is described in connection with the system 100 of FIG. 1. However, it should be understood that the method 200 may be similarly performed using other systems.

At 202, a first block of a first blockchain is accessed, via the network interface circuit 120, by the request circuit 122 of the PABS computing system 106 of FIG. 1. The first block of a first blockchain includes a first block identifier and a first block value. In some embodiments, the first block value is defined as the first block content. In some embodiments, the first block value is defined as the entire first block. In some embodiments, the first block value is defined as a blockchain transaction. For example, a blockchain transaction may include a payment transaction executed and recorded in a ledger, such as Bitcoin. Further, in some embodiments, the first block value is defined as at least a blockchain transaction element. For example, a blockchain transaction element may include a field in which a transaction property is recorded. Payment transactions may include properties that uniquely identify the payer and the payee. In some embodiments of PABS, these properties are used to aggregate the relevant payment transactions. For instance, international money laundering enforcement authorities may collect and track financial transaction information by the payer or payee.

The first block value is initially digitally signed by a party to the transaction, for example, by a user of the signing party computing system 102, using a first digital signature algorithm. The first digital signature algorithm is implemented according to any suitable cryptography methods, such as public key cryptography. In some embodiments, the first digital signature algorithm is defined by the particular blockchain infrastructure of the first blockchain. Typically, only one digital signature algorithm is utilized during any given time period. For example, the first blockchain may utilize an RSA-512 bit key during a first time period and during subsequent periods when the block is verified. Therefore, in some embodiments, the first digital signature algorithm is determined by the record management circuit 126 of the PABS computing system 106 based on the blockchain infrastructure of the first blockchain at the time at which the first block was written to the first blockchain.

In other embodiments, the first blockchain may not utilize the same digital signature algorithm at a given time. For instance, the creator of the block may use a digital signature algorithm that is different from that used by the verifier of the same block. The first blockchain may utilize an RSA-512 bit key during a first time period and subsequently utilize an RSA-1024 bit key during a second period if the RSA-512 key algorithm becomes outdated or compromised. Accordingly, in some embodiments, the first digital signature algorithm associated with the first signer is determined by the record management circuit 126 by accessing an encryption circuit 114 of the signing party computing system 102, which supplies current algorithm(s) for use in the subsequent time periods.

In a typical audit scenario, the original party to a transaction is different from the transaction verifiers. However, some embodiments include archival transactions, where the verifying party using PABS may be the same as the signing party using such that the signing party computing system 102 and the verifying party computing system 104 are the same. In such embodiments, the first digital signature algorithm, used by the original signer, may be determined by the record management circuit 126 by accessing, via network interface circuit 120, an encryption schema vault 118 of the verifying party computing system 104, which supplies the original algorithm used to digitally sign the block.

In yet other embodiments, the original block remains unsigned such that the first digital signature algorithm is supplied by the verification circuit 128 of the PABS computing system 106, bypassing the verifying party computing system 104 or substituting the digital signature algorithm provided by the encryption schema vault 118 of the verifying party computing system 104 with a digital signature assurance algorithm provided by the PABS computing system 106. Thus, in such embodiments, the user of the PABS computing system 106 is the original signer and verifier of the block.

At 204, a first hash is computed on the first signed block value by the record management circuit 126. A suitable hash algorithm may be used, including, for example, SHA-256, SHA-512, SHA-3/Kessak, or BLAKE2.

At 206, a first PABS record is created by the record management circuit 126. The first PABS record comprises a first cryptographic message. The first cryptographic message includes the first block identifier and the first hash. In some embodiments, the first cryptographic message includes a copy of the first block value. In other embodiments, the first cryptographic message includes a pointer to the first block value. Pointers allow information consumers to tie different blocks together. In some embodiments, pointers are stored in signed attributes of a PABS record, referencing the related block. In some embodiments, collections of pointers are thus formed, represented by linked PABS records, in which the original (earliest in time) PABS record is linked to the first block value. Advantageously, this implementation provides for modification of the elements of a PABS record, which cannot be done in the original block. For example, a security policy for the organization that owns the PABS computing system 106 and may have contributed to the creation of blocks on the original blockchain may be documented. Changes in security policy over time that, for example, result in the deprecation of certain encryption algorithms may be recorded. Additionally, as described in reference to FIG. 6, events associated with the content of the primary block object may be recorded.

Referring again to method 206, the first cryptographic message is signed by the record management circuit 126 of the PABS computing system 106 using a second digital signature algorithm. The second digital signature algorithm may be generated according to any suitable method, such as public key cryptography. In some embodiments, the second digital signature algorithm is different from the first digital signature algorithm. In some embodiments, the second digital signature algorithm is determined by the record management circuit 126 of the PABS computing system 106 by accessing, via network interface circuit 120, an encryption schema vault 118 of a verifying party computing system 104. In other embodiments, the second digital signature algorithm may be supplied by a verification circuit 128 of the PABS computing system 106.

Figure 3:
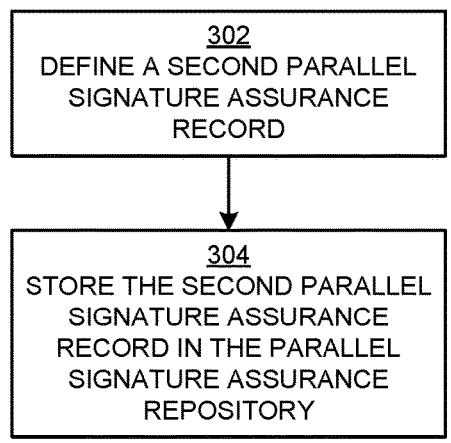
FIG. 3 is a schematic flow diagram illustrating a method of managing a PABS record in relation to an original signed block, according to an example embodiment.

At 208, the first PABS record is stored in a PABS repository 130 by the record management circuit 126 of the PABS computing system 106. In some embodiments, the PABS repository 130 is a relational database. In other embodiments, the PABS repository 130 is a blockchain. In some embodiments, the record management circuit 126 of the PABS computing system 106 defines and stores a second PABS record, as shown in FIG. 3. As described further herein, in some embodiments, the first PABS record is detached (stand-alone). In other embodiments, the first PABS record may be associated, by the PABS computing system 106, with the second PABS record such that the signed records that share certain values or characteristics, represent user-defined anchor points (milestones) of interest, or pertain to related events are thereby aggregated and/or linked.

At 210-216, the verification circuit 128 of the PABS computing system 106 verifies integrity and origin authenticity of the signed first block value. At 210, a digital signature of the first cryptographic message is verified by the verification circuit 128. In some embodiments, verification involves validating digital signatures, generating a verification hash, and verifying that the verification hash matches the hash in the PABS record.

Subsequently, the signed block value is verified. At 212, a digital signature of the signed first block value is verified by the verification circuit 128. At 214, a first verification hash is computed on the first block of the first blockchain by the verification circuit 128.

In some embodiments, the first PABS record, stored at 208 by the record management circuit 126, is signed using the second digital signature algorithm after the first PABS record is verified according to any of 210-216. Thus, PABS accommodates digital signature algorithms that are capable of evolving—for example, when multiple parties use different signature algorithms or if the first digital signature algorithm becomes outdated or is no longer compliant with the parties' regulatory, technical, or operational requirements.

Referring again to method 210, in some embodiments, the PABS computing system 106 may receive, by a verifying party interface circuit 132 from the verifying party computing system 104, a first block verification request message comprising the first block identifier and a desired verification algorithm, which may be retrieved from the encryption schema vault 118 of the verifying party computing system 104. The desired verification algorithm is an algorithm the verifying party knows to have been used by the signing party when verifying and creating the initial PABS record. The desired verification algorithm may comprise a digital signature algorithm according to a suitable method, such as public key cryptography. Further, the desired verification algorithm may comprise a suitable hash algorithm. The PABS computing system 106 accesses by the verifying party interface circuit 132, the first PABS record based on the first block identifier and provides by the verifying party interface circuit 132, the first hash from the first PABS record to the verifying party computing system 104 for use with the desired digital signature algorithm. The verifying party interface circuit 132 may be configured to cause some or all of the operations described herein to be performed by any of the following, individually or in any combination: request circuit 122, record management circuit 126, verification circuit 128, or linking circuit 134.

Figure 2B:
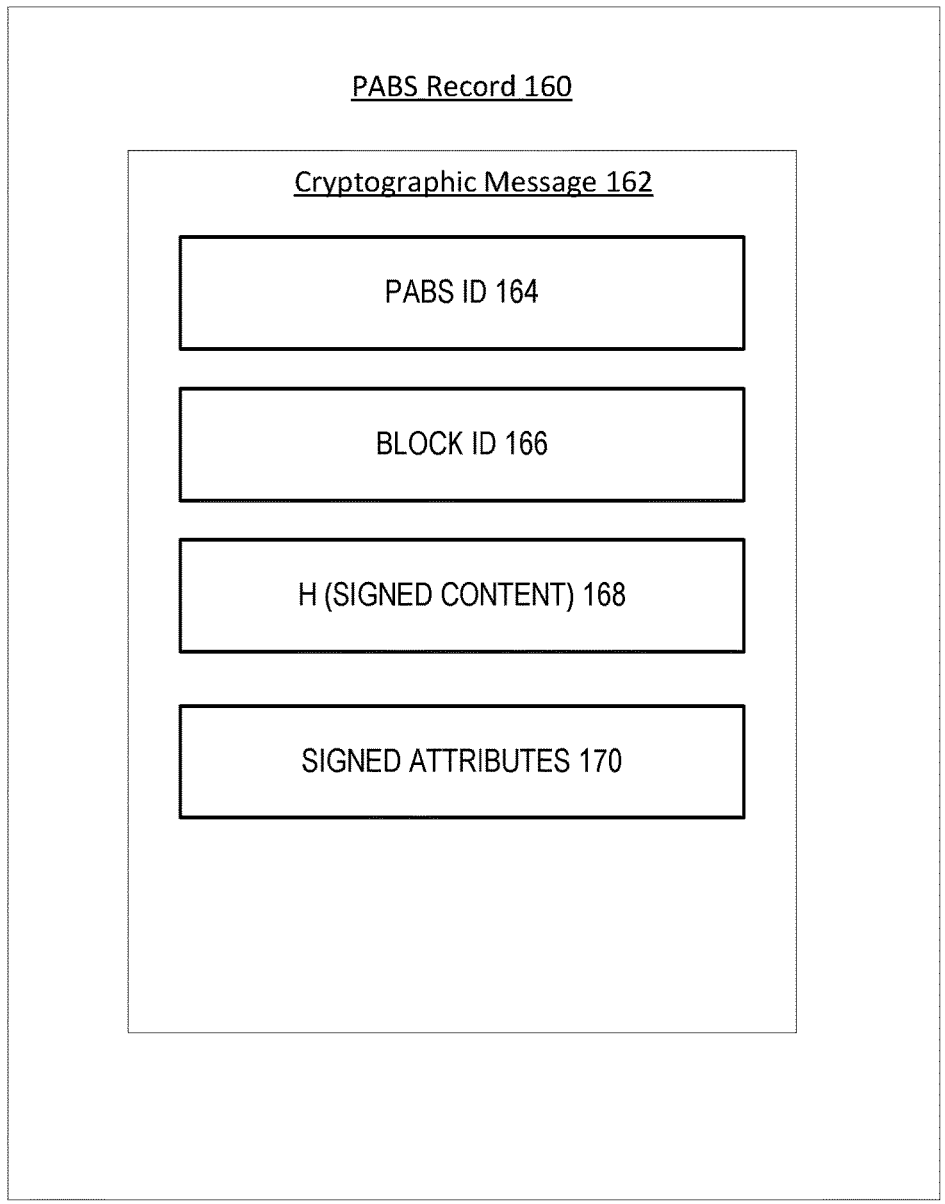
FIG. 2B is a schematic flow diagram illustrating a PABS record, according to an example embodiment.

FIG. 2B is a schematic flow diagram illustrating a PABS record, according to an example embodiment. As shown, the PABS record 160 comprises a cryptographic message 162. The cryptographic message 162, in one example embodiment, includes a PABS ID 164, a block ID 166, and a signed content 168. The PABS ID 164 uniquely identifies the PABS record. The block ID 166 points to the block of the blockchain 150 that was verified. The signed content 168 contains the data content of the block identified by the block ID 166. Some embodiments also include signed attributes 170, which provide additional information about the audit.

Figure 2C:
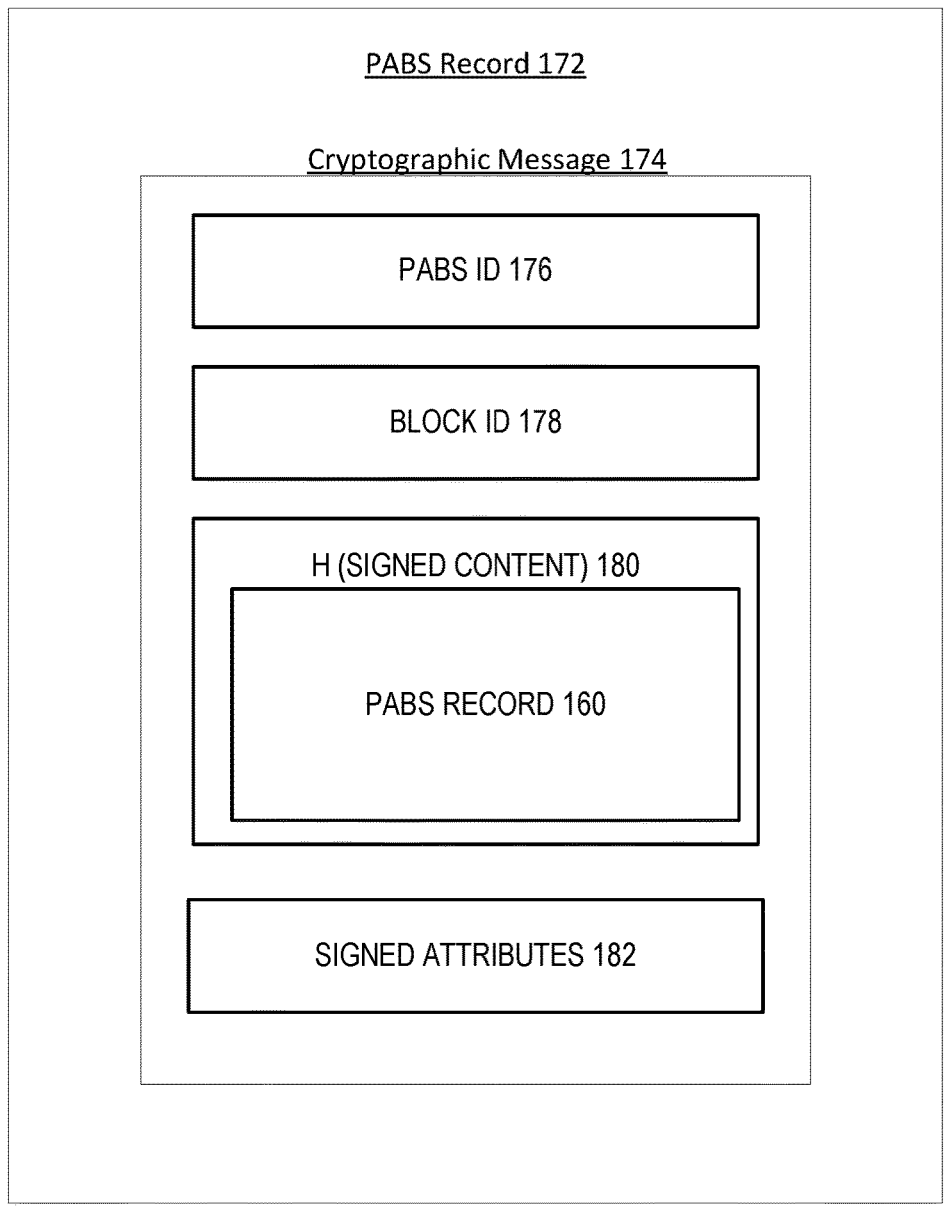
FIG. 2C is a schematic flow diagram illustrating a PABS record nested within another PABS record, according to an example embodiment.

FIG. 2C is a schematic flow diagram illustrating a PABS record nested within another PABS record, according to an example embodiment. As shown, the PABS record 172 comprises a cryptographic message 174. The cryptographic message 174, in one example embodiment, includes a PABS ID 176, a block ID 178, and a signed content 180. The PABS ID 176 uniquely identifies the PABS record. The block ID 178 points to the block of the blockchain 150 that was verified. The signed content 180 contains the PABS record 160 shown in FIG. 2B.

In some embodiments, the signed content 180 contains the PABS record 160 in its entirety. In other implementations, signed content 180 contains a pointer the PABS record 160. Some embodiments also include signed attributes 182, which provide additional information about the audit.

Figure 2D:
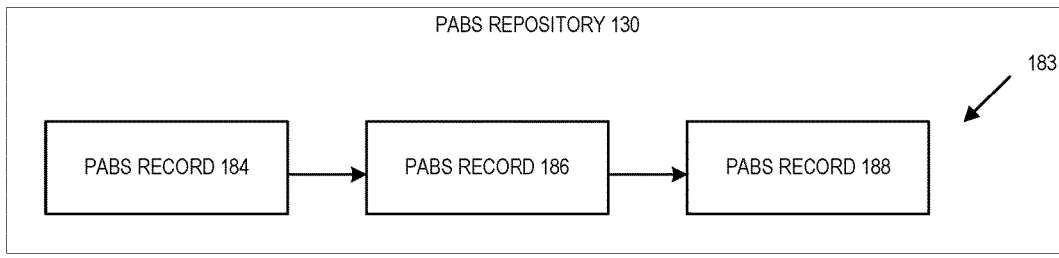
FIG. 2D is a schematic diagram of an example implementation of a parallel signature assurance repository as a blockchain, according to an example embodiment.

FIG. 2D is a schematic diagram of an example implementation of the PABS repository 130 as a blockchain, according to an example embodiment. In the example embodiment, the PABS records are arranged as blocks on a blockchain 183, which may mirror the blockchain 150 shown in FIG. 1. In this example embodiment, the PABS record 184 represents a first audit of the first transaction recorded on the blockchain 150, the PABS record 186 represents an audit of the second transaction recorded on the blockchain 150, and the PABS record 188 represents a second audit of the 1st transaction recorded on the blockchain 150. The PABS records 184, 186, 188 may be referenced in various ways, such as based on the block ID of the corresponding block in the blockchain 150. For each block, the most recent block on the blockchain 183 for a given block ID represents the most recent audit of that block of the blockchain 150.

Figure 2E:
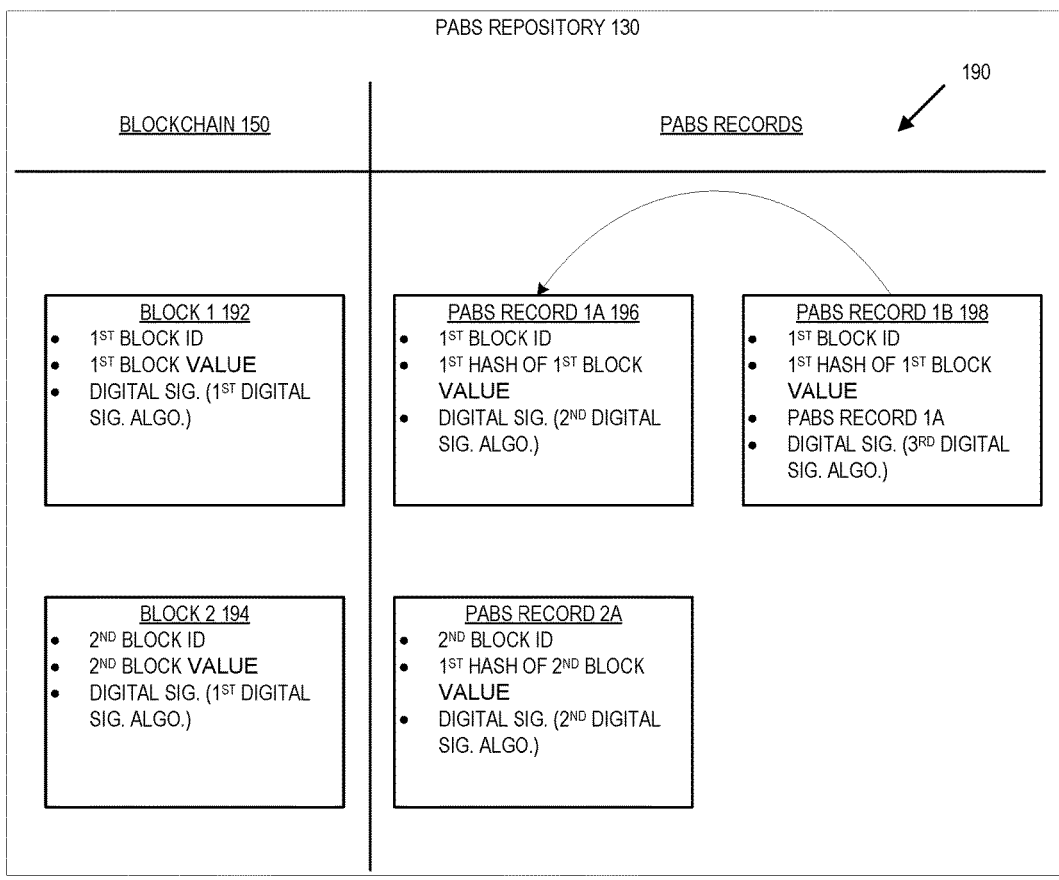
FIG. 2E is a schematic diagram of an example implementation of a parallel signature assurance repository as a relational database, according to an example embodiment.

FIG. 2E is a schematic diagram of an example implementation of the PABS repository 130 as a relational database 190, according to an example embodiment. In this example embodiment, the PABS records are stored in the relational database 190. As shown in FIG. 2E, the PABS records are stored in relation to their corresponding block in the blockchain 150. The blockchain 150 includes first and second blocks 192, 194. A first PABS record 196 is generated based on the first block 192. The first block 192 includes a digital signature generated using a first digital signature algorithm. The first PABS record 196 is generated using a second digital signature algorithm that is different than a first digital signature algorithm. Alternatively, the first PABS record 196 may be generated using a different hash algorithm than that used with the first block 192. A second PABS record 198 is generated using a third digital signature algorithm different than each of the first and second digital signature algorithms. In some embodiments, the second PABS record 198 replaces the first PABS record 196 in the relational database 190. For example, in some embodiments, the second PABS record 198 includes the first PABS record 196. In this implementation, the relational database 190 includes only one PABS record for each block in the blockchain 150. Therefore, the PABS records may be indexed based on the block ID of the corresponding block in the blockchain 150. In other embodiments, however, the relational database 190 includes both of the first and second PABS records 196, 198.

FIG. 3 is a schematic flow diagram illustrating a method 300 of managing, by the record management circuit 126 of a PABS computing system 106, a PABS record, according to an example embodiment. For example, multiple PABS records may be created when there are multiple auditors verifying a block or when the same block is periodically re-verified.

At 302, a second PABS record is defined by the record management circuit 126 of the PABS computing system 106. In some embodiments, the second PABS record comprises a second cryptographic message, as in FIG. 4, for example. The second cryptographic message may include the first cryptographic message, the first block identifier, and the first hash. To assure the integrity and origin authenticity of data sourced from the first blockchain, the second cryptographic message may be signed using a third digital signature algorithm different from the second digital signature algorithm, as in instances, for example, where the second digital assurance algorithm used in PABS becomes compromised or outdated.

At 304, the second PABS record is stored by the record management circuit 126 of the PABS computing system 106 in the PABS repository 130. In embodiments where the PABS repository 130 is a relational database, storing the second PABS record may comprise replacing the first PABS record with the second PABS record.

Conventionally, computer data storage is defined as the use of computer components to retain digital data. In contrast, and advantageously, the PABS computing system 106, in addition to mere retention of digital data, incorporates embodiments that comprise encapsulating the original signed block within its verification history (nesting), decoupling of the original signed block value from the original source blockchain (detached data), and blocking attributes whose values are trackable through time. These concepts, explained in detail below, ensure data security, improve computational efficiency in proof-of-work processes on the blockchain, and allow for blockchain data aggregation and for tracking of transactions of particular interest.

In some embodiments, the second cryptographic message is nested within the first cryptographic message. Additionally or alternatively, the original signed block (the first block) is nested within its verification history, represented by successive PABS records. One way to accomplish this is to structure a PABS record using one or multiple CMS SignedData messages.

The Cryptographic Message Syntax (CMS) standard includes specifications for objects that represent the content exchanged between digital entities. Content exchanged between entities may be classified by content (message) type. One such content (message) type is known as SignedData as defined, for example, in RFC 5652 published by the Internet Engineering Task Force. The SignedData message type may contain both encryption information and actual content. The SignedData message type can implement nested data structures. The signed first block is encapsulated in a SignedData message, which may be part of the first PABS record. Over time, the first SignedData message, or the first PABS record, is used as the content to be signed in another instance of SignedData, such as in a second PABS record. At the validation stage, the user of the verifying party computing system 104 directs the verification circuit 128 to evaluate the most recent instance of SignedData and verifies the signature as described in reference to FIG. 1. Subsequently, the first SignedData message is extracted from the validated SignedData message, and this message is again verified and validated. Advantageously, the recursive descent technique of this embodiment requires only traversing the verification history of a single block rather than traversing the entire blockchain through resource-intensive proof-of-work computations on the content of the original blockchain. The recursive descent into nested messages terminates when the content is revealed to not be another CMS type but ordinary data. For instance, in a digital transaction requiring permanence or long-term storage, such as a 30-year mortgage, it is possible go back in time to the original content (the first block), and it becomes possible to determine whether that blockchain object has integrity by comparing the value of the first block value to the value captured from the first block and verified, possibly multiple times on a periodic audit basis, by PABS.

Referring again to method 304, in embodiments where cryptographic assurance algorithms are particularly vulnerable to being compromised, the second cryptographic message is detached from the original block and/or from the verification history comprising the first cryptographic message and the first PABS record. For example, in embodiments where the PABS repository 130 is a blockchain, storing the second PABS record may comprise including a pointer to the first PABS record in the second PABS record. Thus, the signature is separated from prior verification activity in addition to being separated from the original first block value.

Additionally, the PABS system allows the tracking and evolution of data attributes associated with a transaction captured in a particular block. For example, a security policy for the organization that owns and/or operates the PABS computing system 106 and may have contributed to the creation of blocks on the original blockchain may be documented, and changes in the security policy over time that, for example, result in the deprecation of certain encryption algorithms may likewise be recorded. When multiple PABS records are created throughout an audit lifecycle, the evolution of these attributes may be tracked.

Figure 4:
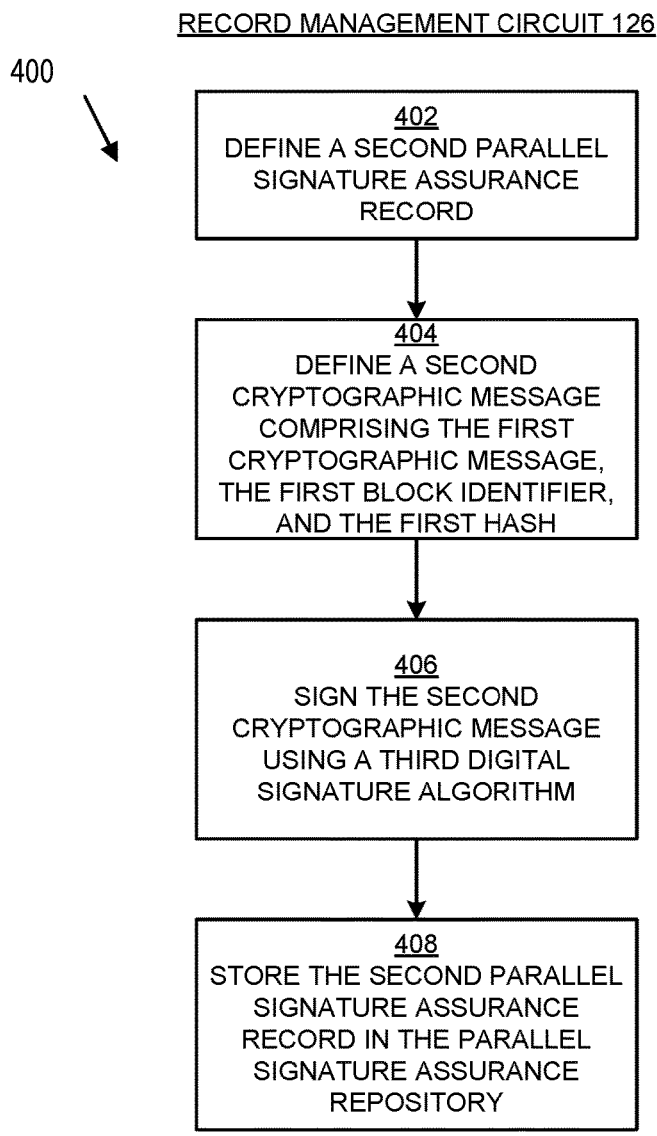
FIG. 4 is a schematic flow diagram illustrating a method of managing a cryptographic message for PABS, according to an example embodiment.

FIG. 4 is a schematic flow diagram illustrating a method 400 of managing a cryptographic message for PABS, according to an example embodiment. This method pertains to a certain embodiment implementing PABS in which a different digital signatures or digital signature algorithms are used, as described in relation to method 302, for example. A different digital signature or different signature algorithm may be used in a PABS record if the first digital signature algorithm utilized on the first (source) blockchain or the second digital signature algorithm utilized on the first PABS record was compromised or no longer meets the parties' operational, technical, or regulatory requirements.

At 402, a second PABS record is defined by the record management circuit 126 of the PABS computing system 106. This may be done as described in reference to method 302, for example.

At 404, a second cryptographic message is defined by the record management circuit 126 of the PABS computing system 106. In some embodiments, the second cryptographic message includes the first cryptographic message, the first block identifier, and the first hash. In certain embodiments, in addition to including the first block identifier, the second cryptographic message includes the first block value.

At 406, the second cryptographic message is signed by the record management circuit 126 of the PABS computing system 106 using a third digital signature algorithm. The third digital signature algorithm may be generated according to any suitable method, such as public key cryptography, and may be different from the second digital signature algorithm. In some embodiments, the third digital signature algorithm may be determined by the record management circuit 126 of the PABS computing system 106 by the encryption circuit 114 of the signing party computing system 102. In other embodiments, the third digital signature algorithm may be determined by the record management circuit 126 of the PABS computing system 106 by the encryption schema vault 118 of a verifying party computing system 104. In other embodiments, the third digital signature algorithm may be supplied by a verification circuit 128 of the PABS computing system 106.

At 408, the second PABS record comprising the second cryptographic message signed using the third digital signature algorithm is stored in the PABS repository 130 by the record management circuit 126 of the PABS computing system 106. In certain embodiments, the second PABS record is stored as described, for example, in reference to method 304.

FIG. 5 is a schematic flow diagram illustrating a method 500 of managing the hash computation component of a cryptographic message in PABS, according to an example embodiment. In contrast to the method of FIG. 4, this method pertains to a certain embodiment implementing PABS in which a different hash or hash algorithm is used (e.g., in case the first hash on the first (source) blockchain was compromised or if the hash algorithm no longer meets the parties' operational, technical, or regulatory requirements).

At 502, a second PABS record is defined by the record management circuit 126 of the PABS computing system 106 according to, for instance, FIG. 4 and/or FIG. 5.

At 504, the record management circuit 126 of the PABS computing system 106 computes a first hash using a first hash algorithm, which may be any suitable hash algorithm.

At 506, the record management circuit 126 of the PABS computing system 106 computes a second hash using a second hash algorithm, which may be any suitable hash algorithm. To assure the integrity and origin authenticity of data sourced from the first blockchain, the second hash algorithm may be different from the first hash algorithm if the first hash algorithm is compromised or no longer meets technical, operational, or regulatory requirements.

At 508, the record management circuit 126 of the PABS computing system 106 defines a second cryptographic message. In some embodiments, the second cryptographic message comprises the first cryptographic message, the first block identifier, and the second hash.

At 510, the second cryptographic message is digitally signed by the record management circuit 126 of the PABS computing system 106 using a fourth digital signature algorithm. The fourth digital signature algorithm may be generated according to a suitable method, such as public key cryptography, and may be different from the second digital signature algorithm if, for example, the second digital signature becomes compromised or outdated. In some embodiments, the fourth digital signature algorithm is determined by the record management circuit 126 of the PABS computing system 106 by accessing, via network interface circuit 120, the encryption circuit 114 of the signing party computing system 102. In other embodiments, the fourth digital signature algorithm may be determined by the record management circuit 126 of the PABS computing system 106 by accessing, via network interface circuit 120, an encryption schema vault 118 of a verifying party computing system 104. In other embodiments, the fourth digital signature algorithm may be supplied by a verification circuit 128 of the PABS computing system 106. In some embodiments, the fourth digital signature algorithm is the same as the second digital signature algorithm. In other embodiments, the fourth digital signature algorithm is different from the second digital signature algorithm.

At 512, the second parallel assurance record, comprising the second cryptographic message signed using the fourth digital signature algorithm, is stored in the PABS repository 130 by the record management circuit 126 of the PABS computing system 106.

PABS provides for increased collaboration when some parties do not have the assurance necessary to trust the security algorithms of other parties. In some embodiments, such as where the parties may have divergent technical, operational, or regulatory requirements with respect to cryptographic methods, the PABS computing system 106 of PABS may comprise a first and a second (shadow) PABS repositories. The content of the first repository may be protected using a different cryptographic technique and/or a different suitable hash computation method. For example, several consortium members, each from a different country, may each favor a particular set of cryptographic algorithms. Each may maintain, using their own algorithms, a different set of encryption algorithms allowable for use on a blockchain. This may be based, for example, on organizational policy or information governance-related factors. If the consortium, as a group, runs a single blockchain, each party is able to gain assurance by running PABS verification on the blockchain using trusted algorithms.

Specifically, in certain embodiments, the first block of the first blockchain is accessed by the verifying party interface circuit 132 and a third hash is computed on the signed first block value using a third hash algorithm, which in some embodiments differs from the first and/or second hash algorithm. In some embodiments, for example, as in FIG. 1, the third hash algorithm is included in the desired verification algorithm retrieved from the encryption schema vault 118 of the verifying party computing system 104. The verifying party interface circuit 132 defines a third PABS record comprising a third cryptographic message, which includes the first block identifier and the third hash and is stored in the second PABS repository.

Figure 6:
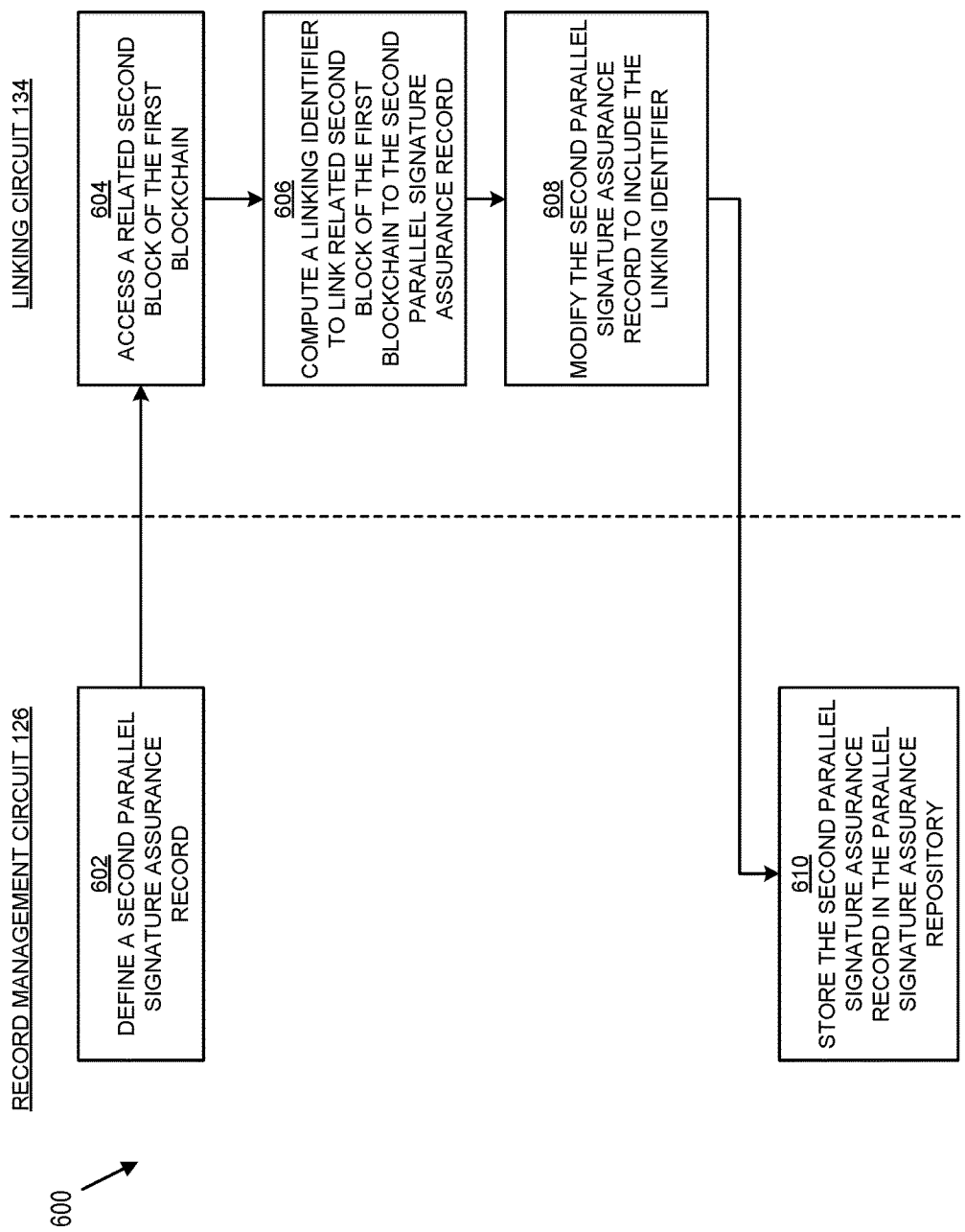
FIG. 6 is a schematic flow diagram illustrating a method of computing a linkage identifier for multiple PABS records that relate to different aggregated blocks, according to an example embodiment.

FIG. 6 is a schematic flow diagram illustrating a method 600 of computing a linkage identifier for multiple PABS records where it is desirable to aggregate the data points of value from a transaction history recorded on the blockchain or to define event anchors. For example, certain data points of interest stored on a blockchain can be tracked.

Figure 9:
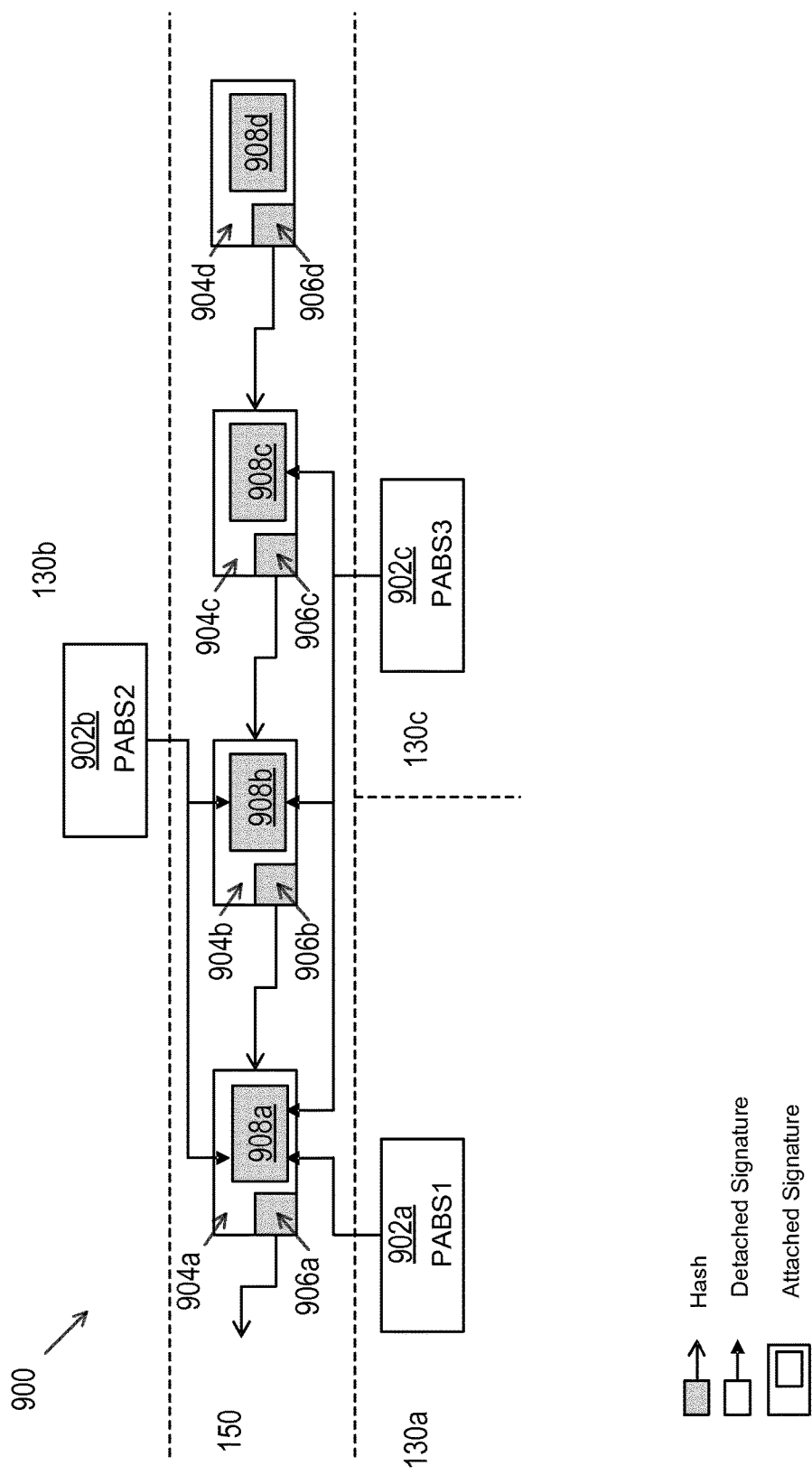
FIG. 9 is a schematic diagram illustrating a PABS implementation where PABS records are each associated with one or more blocks of a blockchain.

In a blockchain, such as a settlement blockchain, involving multiple parties, such as one shown in FIG. 9, a particular party may wish to note (identify or mark) a particular event by creating a signed PABS record and storing a copy of the related block in the PABS record. Additionally, the party may wish to note several events of relevance, including, for example, that someone defaulted on the contract or that the contract terminated because all of the payment terms associated with the contract have been met. The party may take primary blockchain objects A, Y, and Z (skipping steps B-X, which may have no relevance to this particular party), create a PABS record for each, and aggregate them by encapsulating the PABS records within one another. As a result, the party obtains the entire relevant history of an event in one entity, which represents the PABS record associated with the most recent event Z and encapsulates the earlier transactions of relevance. Furthermore, the party may identify a particular element, transaction, or block as the content of interest and may track the evolution of this content item by creating and managing PABS attributes.

Specifically, at 602, the record management circuit 126 of the PABS computing system 106 defines a second PABS record, as described, for example, according to FIG. 4, FIG. 5, and/or FIG. 6.

At 604, a related second block of the first blockchain is accessed by the linking circuit 134 of the PABS computing system 106. In some embodiments, the related second block may be part of the first signature assurance record and may be accessed therefrom. The second PABS record may be traversed to identify a segment serving as the basis for identifying the related second block of the first blockchain. In some embodiments, a related second block may be identified based on the first block value. In other embodiments, a related second block may be identified based on the first block transaction. In certain embodiments, a related second block may be identified based on an element of the first block transaction. The linking circuit 134 may be configured to instruct any of the following to perform the functions outlined herein, alone or in any combination: request circuit 122, record management circuit 126, verification circuit 128, or verifying party interface circuit 132.

At 606, a linking identifier is computed by the linking circuit 134 of the PABS computing system 106 to link the related second block of the first blockchain, defined at 604, to the second PABS record. As described with respect to 604, in some embodiments, the linking identifier may comprise a first block hash, first block value, first block transaction, or an element of a first block transaction. In some embodiments, the linking identifier may comprise an identifier generated according to a suitable method, such as a Relative Unique Identifier or a Global Unique Identifier.

At 608, the linking circuit 134 of the PABS computing system 106 modifies the second PABS record to include the linking identifier.

At 610, the record management circuit 126 of the PABS computing system 106 stores the second PABS record in the PABS repository 130.

Figure 7A:
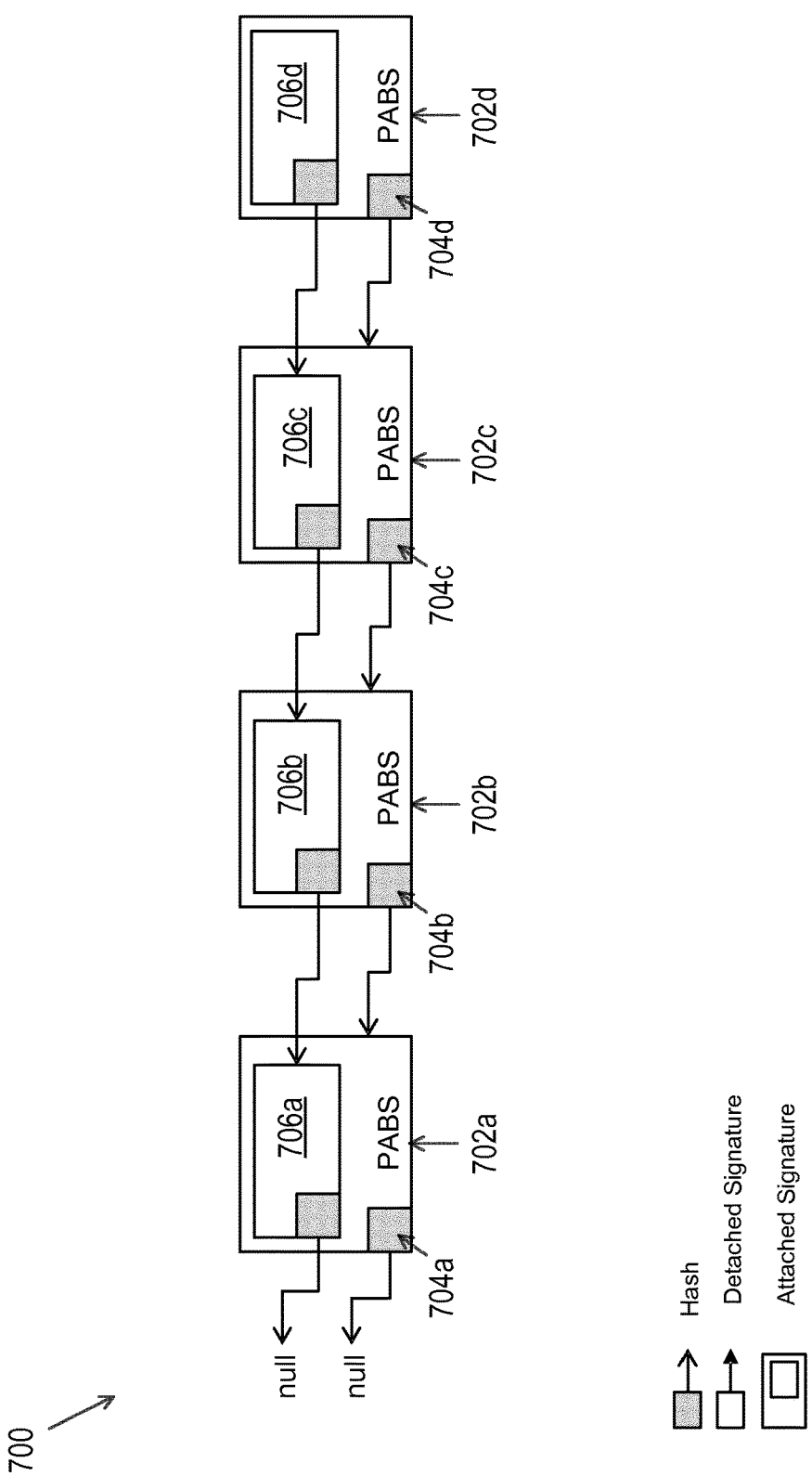
FIG. 7A is a schematic diagram illustrating a PABS implementation where attached PABS records are associated with successive blocks of a blockchain.

FIG. 7A is a schematic diagram illustrating a PABS implementation 700 where attached PABS records are associated with blocks of a blockchain such that PABS is an add-on to the blockchain 150. In some implementations, these blocks are successive blocks. As shown, the blockchain 150 comprises one or more successive blocks, such as blocks 706a, 706b, 706c, and 706d. Each of these blocks, except the first block 706a, is linked to the preceding block of the blockchain 150 by the preceding block's hash value.

PABS records 702a, 702b, 702c, and 702d encapsulate, respectively, blocks 706a, 706b, 706c, and 706d. The PABS records 702a, 702b, 702c, and 702d are arranged in a blockchain that comprises the PABS repository 130 such that each of these PABS records is a wrap-around on a block on the of the blockchain 150. Thus, in some embodiments, the PABS repository 130 is the blockchain 150. Each of these PABS records, except the first PABS record 702a, is linked to the preceding block of the PABS repository 130 by the preceding block's hash value. For example, the PABS record 702b comprises a hash value 704a, which is the hash associated with the preceding PABS record 702a of the PABS repository 130.

In some embodiments, each of the PABS records 702a, 702b, 702c, and 702d provide verification of only the content fields of each respective block 706a, 706b, 706c, and 706d instead of the entirety of each respective block. In such embodiments, the block's value is defined as the value of the block's content. Where the entirety of each respective block is covered by a PABS record, the block's value is defined as the value of the block inclusive of the block's identifier and the block's content.

Figure 7B:
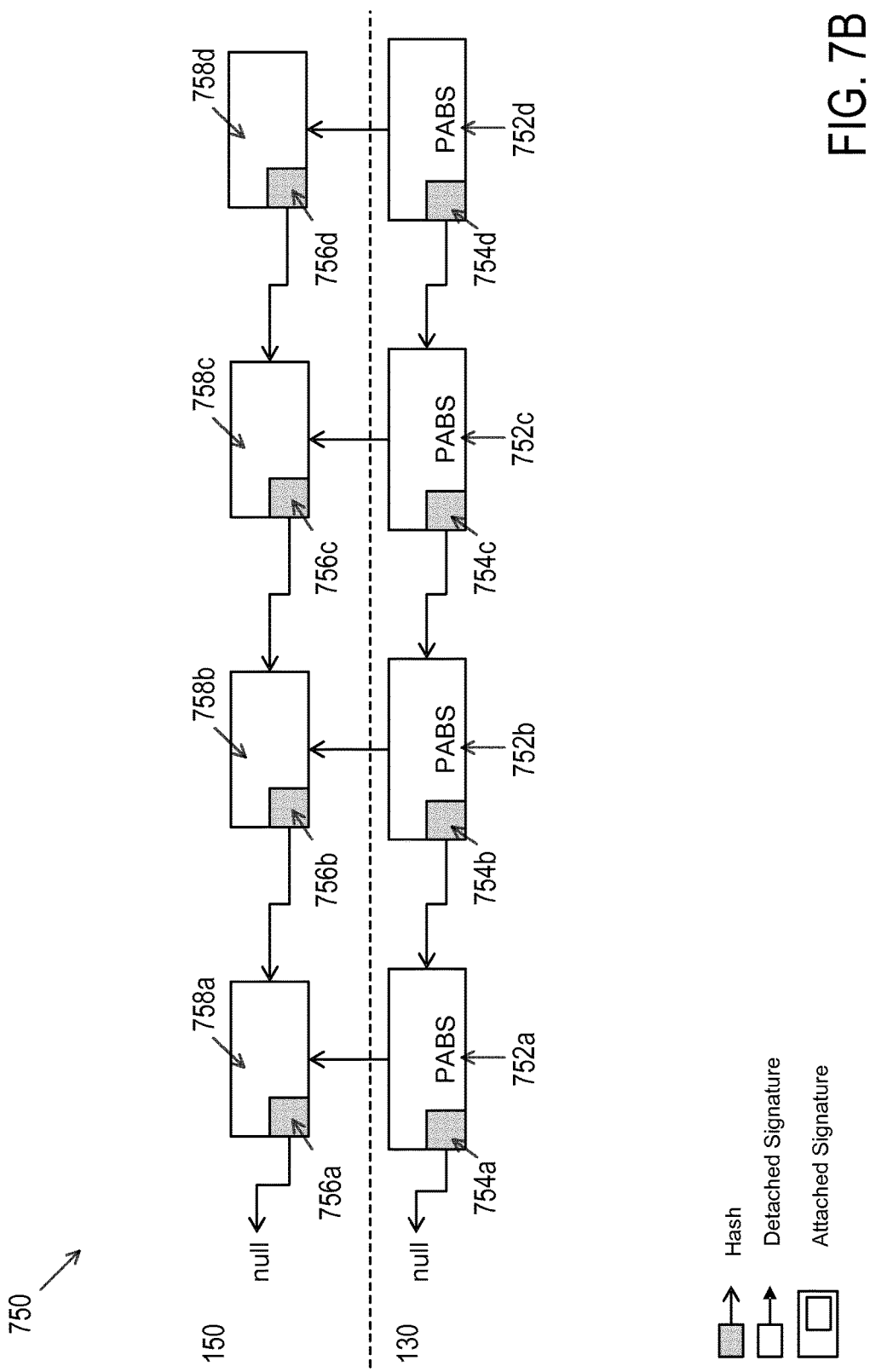
FIG. 7B is a schematic diagram illustrating a PABS implementation where detached PABS records are associated with successive blocks of a blockchain.

FIG. 7B is a schematic diagram illustrating a PABS implementation 750 where detached PABS records are associated with successive blocks of a blockchain. In some implementations, these blocks are successive blocks. As shown, the blockchain 150 comprises one or more successive blocks, such as blocks 758a, 758b, 758c, and 758d. Each of these blocks, except the first block 758a, is linked to the preceding block of the blockchain 150 by the preceding block's hash values—respectively, hash values 756a, 756b, 756c, and 756d. For example, block 758b of the blockchain 150 is linked to the preceding block 758a by the hash value 756a, a copy of which is also stored in the block 758b of the blockchain 150. The linking is described, for example, in FIG. 6.

With respect to the structure of the PABS repository 130, the PABS records 752a, 752b, 752c, and 752d are arranged in a blockchain that comprises the PABS repository 130 such that each of these PABS records is a block on the PABS repository blockchain. Each of these PABS records, except the first PABS record 752a, is linked to the preceding block of the PABS repository 130 by the preceding block's hash value. For example, the PABS record 752b comprises the hash value 754a, which is the hash associated with the preceding PABS record 752a of the PABS repository 130.

With respect to the structure of the PABS repository 130 relative to the blockchain 150, the PABS records 752a, 752b, 752c, and 752d are linked in a detached fashion (for example, via pointers to the respective block identifiers), respectively, to blocks 758a, 758b, 758c, and 758d of the blockchain 150. As a result of the detached linking, the PABS repository 130 separate from the blockchain 150. As an example of linking via pointers to the respective block identifiers, the PABS record 752b is linked to the block 758b via the hash 756b a copy of which is also stored in the block 752b of the PABS repository 130.

In some embodiments, each of the PABS records 752a, 752b, 752c, and 752d provide verification of only the content fields of each respective block 758a, 758b, 758c, and 758d instead of the entirety of each respective block. In such embodiments, the block's value is defined as the value of the block's content. Where the entirety of each respective block is covered by a PABS record, the block's value is defined as the value of the block inclusive of the block's identifier and the block's content.

Figure 8:
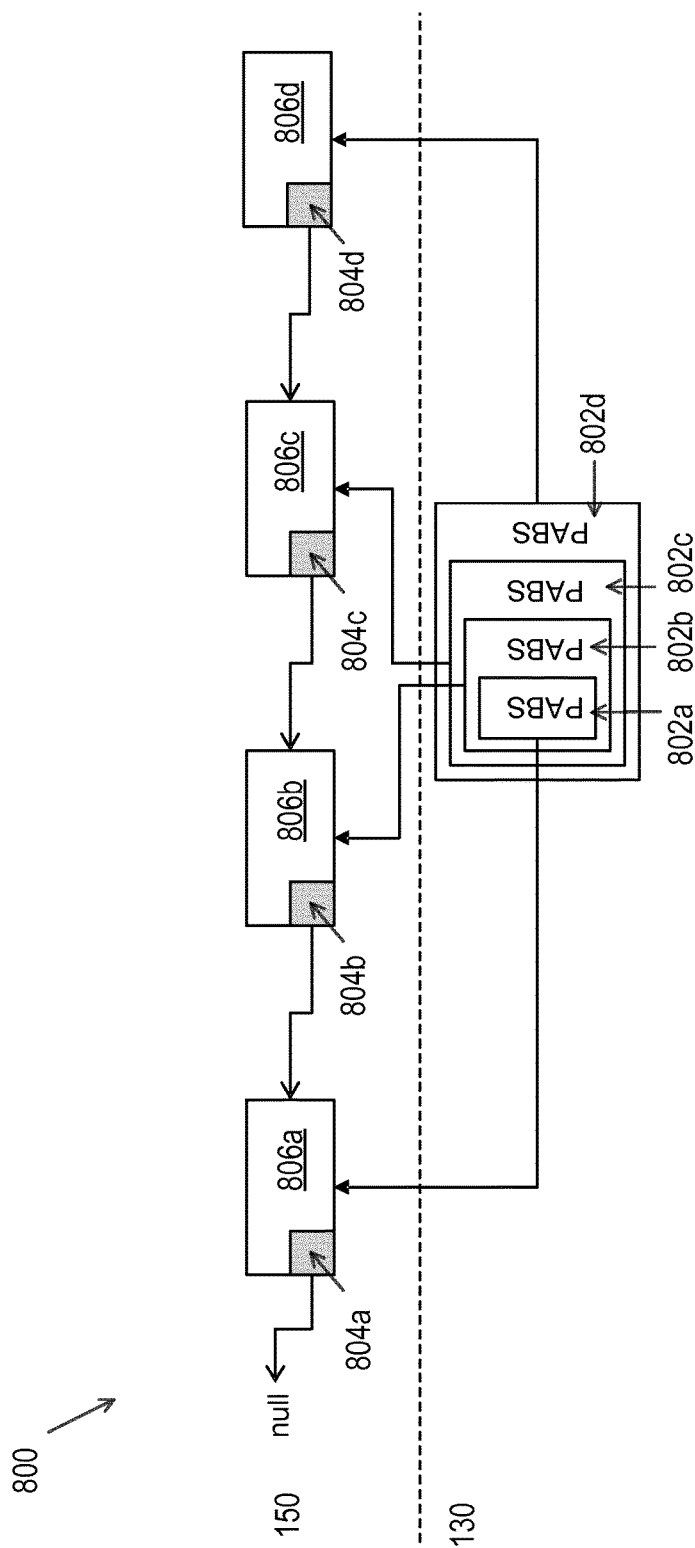
FIG. 8 is a schematic diagram illustrating a PABS implementation where attached, nested PABS records are associated with blocks of a blockchain.

FIG. 8 is a schematic diagram illustrating a PABS implementation 800 where attached, nested PABS records are associated with blocks of a blockchain. As shown, the blockchain 150 comprises one or more blocks, such as blocks 806a, 806b, 806c, and 806d, which in some embodiments are successive blocks. Each of these blocks, except the first block 806a, is linked to the preceding block of the blockchain 150 by the preceding block's hash values— respectively, hash values 804a, 804b, 804c, and 804d. For example, block 806b of the blockchain 150 is linked to the preceding block 806a by the hash value 804a, a copy of which is also stored in the block 806b of the blockchain 150.

In some embodiments, the PABS repository 130 is a set of nested CMS messages, such as SignedData messages. Thus, the PABS records 802a, 802b, 802c, and 802d are stored the PABS repository 130 such that each of these PABS records encapsulates the earlier record(s) pertaining to the audit of the same blockchain as described, for example, in FIG. 2C.

The PABS records 802a, 802b, 802c, and 802d are linked in a detached fashion (for example, via pointers to the respective block identifiers), respectively, to blocks 806a, 806b, 806c, and 806d. As a result of the detached linking, the PABS repository 130 is separate from the blockchain 150. As an example of linking via pointers to the respective block identifiers, the PABS record 802a is linked to the block 806a via the hash 804a, a copy of which is also stored in the PABS record 802a of the PABS repository 130 as described, for example, in FIG. 2B.

In some embodiments, each of the PABS records 802a, 802b, 802c, and 802d provide verification of only the content fields of each respective block 806a, 806b, 806c, and 806d instead of the entirety of each respective block. In such embodiments, the block's value is defined as the value of the block's content. Where the entirety of each respective block is covered by a PABS record, the block's value is defined as the value of the block inclusive of the block's identifier and the block's content.

FIG. 9 is a schematic diagram illustrating a PABS implementation 900 where PABS records are each associated with one or more blocks of a blockchain. As shown, the blockchain 150 comprises one or more blocks, such as blocks 904a, 904b, 904c and 904d, which in some embodiments are successive blocks. Each of these blocks, except the first block 904a, is linked to the preceding block of the blockchain 150 by the preceding block's hash values—respectively, hash values 906a, 906b, 906c and 906d. For example, block 904b of the blockchain 150 is linked to the preceding block 904a by the hash value 906a, a copy of which is also stored in the block 904b of the blockchain 150.

The PABS records 902a, 902b, and 902c are stored the PABS repository 130. In some embodiments, such as collaborative audit environments with multiple auditors, the PABS records 902a, 902b, and 902c are stored in different PABS repositories 130, such as repositories 130a, 130b and 130c.

The PABS records 902a, 902b, and 902c are linked in a detached fashion (for example, via pointers to the respective block identifiers), to one or more blocks of the blockchain 150. As a result of the detached linking, the PABS repository 130 is separate from the blockchain 150. As an example of linking via pointers to the respective block identifiers, the PABS record 902a is linked to the block 904a via the hash 906a, a copy of which is also stored in the PABS record 902a of the PABS repository 130 as described, for example, in FIG. 2B.

In some embodiments, a single PABS record is associated with multiple blocks of the blockchain 150, which in some embodiments are successive blocks. This enables at least multiple-block audits of the PABS protocol. For example, the PABS record 902b stores audit information and the hashes 906a and 906b of the blocks 904a and 904b, respectively.

In some embodiments of multi-party audits using PABS, a single block is audited by multiple parties. For example, as shown, the block 904a is audited twice, as represented by the PABS records 902a and 902b. These PABS record may reside in the same or different PABS repositories 130, such as 130a and 130b, respectively.

In some embodiments, each of the PABS records 902a, 902b, and 902c provide verification of only the content of each respective block 904a, 904b and 904c instead of the entirety of each respective block. For instance, as shown, the content field of block 904a is 908a, and it is audited using one or more PABS record(s), such as PABS records 902a and 902b. In such embodiments, the block's value is defined as the value of the block's content.

Where the entirety of each respective block is covered by a PABS record, the block's value is defined as the value of the block inclusive of the block's identifier and the block's content.

The arrangements described herein have been described with reference to drawings. The drawings illustrate certain details of specific arrangements that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
    responsive to receiving a request for verification of integrity and origin authenticity of a first block in a first blockchain, accessing, by a request circuit of a parallel assurance of blockchain signatures ("PABS") computing system, the first block of the first blockchain, the first block including a first block identifier and a first block value signed using a first digital signature algorithm, wherein the first digital signature algorithm is a legacy digital signature algorithm or an up-to-date digital signature algorithm;
    computing, by a record management circuit of the PABS computing system, a first hash on the signed first block value;
    defining, by the record management circuit, a first PABS record comprising a first cryptographic message, the first cryptographic message including the first block value and the first hash, the first cryptographic message being signed using a second digital signature algorithm, wherein the second digital signature algorithm is an up-to-date digital signature algorithm; and
    storing, by the record management circuit, the first PABS record in a PABS repository;
    wherein integrity and origin authenticity of the signed first block value is verified without sending the first block value to a verifying party computing system, by a verification circuit of the PABS computing system, by:
        verifying a digital signature of the first cryptographic message,
        verifying a digital signature of the signed first block value,
        computing a first verification hash on the signed first block value of the first block of the first blockchain, and
        verifying that the first hash from the first cryptographic message matches the first verification hash.

2. The method of claim 1, wherein the first block value is the value of the first block inclusive of the first block identifier and a first block content.

3. The method of claim 1, wherein the first block value is the value of the first block content.

4. The method of claim 1, wherein the first block value includes at least one of a blockchain transaction and a blockchain transaction element.

5. The method of claim 1, wherein the first cryptographic message of the first PABS record further includes a copy of the first block value.

6. The method of claim 5, wherein the first cryptographic message of the first PABS record further includes a trusted time stamp associated with the first block value.

7. The method of claim 1, wherein the first PABS record includes an identifier of a security policy used by a PABS creator such that a verifying party is enabled to evaluate the security policy to determine if the first PABS record is compliant with the security policy.

8. The method of claim 7, wherein determining if the first PABS record is compliant with the security policy comprises evaluating the second digital signature algorithm used by the PABS creator to digitally sign the first cryptographic message.

9. The method of claim 7, wherein determining if the first PABS record is compliant with the security policy comprises evaluating a length of a key associated with the first cryptographic message.

10. The method of claim 7, wherein determining if the first PABS record is compliant with the security policy comprises determining if the PABS creator was authorized to perform an audit of the first block value at a time the first cryptographic message was signed.

11. The method of claim 10, further comprising evaluating a PKI certificate associated with the PABS creator.

12. The method of claim 1, further comprising:
    defining, by the record management circuit, a second PABS record; and
    storing, by the record management circuit, the second PABS record in the PABS repository.

13. The method of claim 12, wherein the second PABS record comprises a second cryptographic message, the second cryptographic message including the first cryptographic message, the first block identifier, and the first hash, the second cryptographic message being signed using a third digital signature algorithm different than the second digital signature algorithm.

14. The method of claim 12, wherein the first hash is computed using a first hash algorithm, and further comprising:
    computing, by the record management circuit, a second hash on the signed first block value using a second hash algorithm, the second hash algorithm being different than the first hash algorithm,
    wherein the second PABS record comprises a second cryptographic message, the second cryptographic message including the first cryptographic message, the first block identifier, and the second hash, the second cryptographic message being signed using a fourth digital signature algorithm.

15. The method of claim 12, wherein the PABS repository is a relational database.

16. The method of claim 12, wherein storing the second PABS record comprises replacing the first PABS record with the second PABS record.

17. The method of claim 12, wherein the PABS repository is a distributed ledger.

18. The method of claim 12, wherein the PABS repository is a blockchain.

19. The method of claim 17, wherein the second PABS record includes a hash linking the second PABS record to the first PABS record.

20. The method of claim 1, wherein the PABS repository is a first PABS repository, and further comprising:
- accessing, by a verifying party interface circuit, the first block of the first blockchain;
- computing, by the verifying party interface circuit, a third hash on the signed first block value using a third hash algorithm;
- defining, by the verifying party interface circuit, a third PABS record comprising a third cryptographic message, the third cryptographic message including the first block identifier and the third hash; and
- storing, by the verifying party interface circuit, the third PABS record in a second PABS repository.

21. The method of claim 1, further comprising:
- receiving, by a verifying party interface circuit of the PABS computing system from the verifying party computing system, a first block verification request message comprising the first block identifier;
- assessing, by the verifying party interface circuit, the first PABS record based on the first block identifier; and
- providing, by the verifying party interface circuit to the verifying party computing system, the first PABS record.

* * * * *